Sept. 25, 1923.                T. A. JOHNSON                1,469,089
                               CHAIN FASTENER
                            Filed Sept. 27, 1921
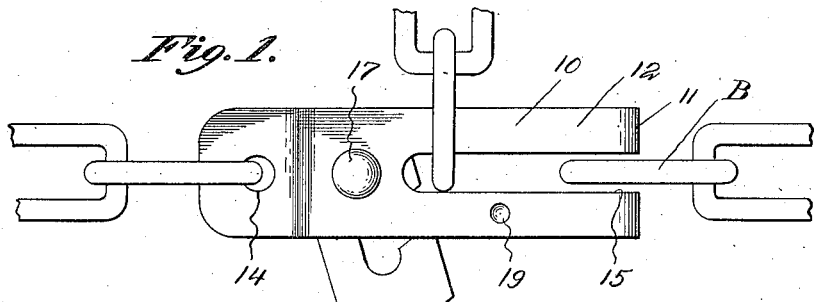
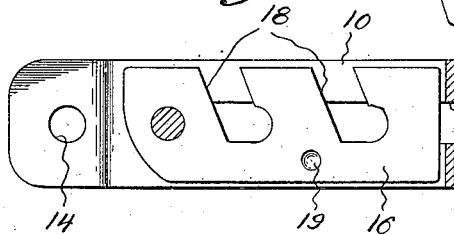   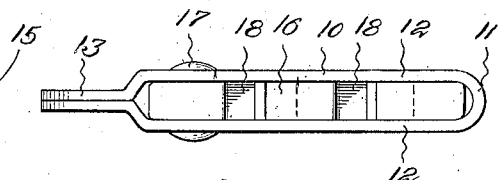
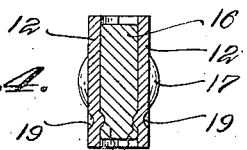   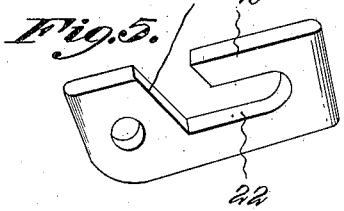
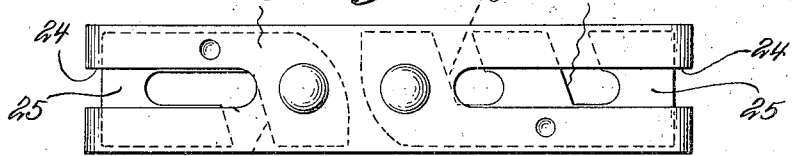
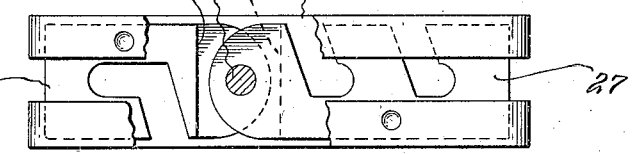
Thomas A. Johnson
INVENTOR
BY Victor J. Evans
ATTORNEY
WITNESS:

Patented Sept. 25, 1923.

1,469,089

UNITED STATES PATENT OFFICE.

THOMAS A. JOHNSON, OF MANNING, NORTH DAKOTA.

CHAIN FASTENER.

Application filed September 27, 1921. Serial No. 503,487.

*To all whom it may concern:*

Be it known that I, THOMAS A. JOHNSON, a citizen of the United States, residing at Manning, in the county of Dunn and State of North Dakota, have invented new and useful Improvements in Chain Fasteners, of which the following is a specification.

This invention relates to fastening devices, particularly to devices adapted for use upon skid chains and the like, and has for its object the provision of a novel chain fastener which may be used for securing together the ends of skid chains or which may be used as a splice for connecting the broken ends of a chain, the construction of the securing member being such that opening thereof is impossible regardless of the direction in which the wheels carrying the skid chain equipped with my device is rotated.

It is well known that most types of the ordinary chain fasteners such as are used on skid chains of automobiles are apt to become unfastened in the event that the automobile is driven rearwardly, for the reason that most of these fasteners are provided with a lift and over-hanging portion which when the vehicle is reversed gather up mud, dirt and the like and consequently spread open and release the chain so that the latter is frequently lost. It is also well known that the ordinary type of chain fasteners when caked with mud must be cleaned, that is the mud must be dug out of the chain receiving notches by means of a screw driver or other implement before it is possible to again use the device for holding a chain. It is with the above mentioned objections in view that the invention has been designed.

An important and more specific object is the provision of a chain fastening device which when used single is adapted to secure the ends of a skid chain or other chains and which used in its double form may be used as a splice for repairing a broken chain, the device being furthermore so constructed that when in closed position accidental opening thereof will be positively prevented.

Another object is the provision of a device of this character which may be cast but which is preferably formed of sheet metal and which includes an outer enclosing portion within which is pivoted a catch member provided with notches for engagement of a skid chain linked therewith.

An additional object is the provision of a device of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings in which, Figure 1 is a side elevation of one form of my device showing it in open position and engaged with the ends of a chain to be fastened, Figure 2 is a longitudinal sectional view showing the parts in fastened position, Figure 3 is a plan view with the parts arranged as shown in Figure 2, Figure 4 is a cross-sectional view, Figure 5 is a perspective view of a modified form of movable member, Figure 6 is a side elevation of a double ended form of the device and, Figure 7 is a side elevation of a still different double ended form of the device.

Referring more particularly to the drawings I have shown my device as comprising an outer member 10 which is formed as an elongated strip of sheet metal bent upon itself intermediate its ends as shown at 11 whereby to define sides 12 which are of uniform width and which are parallel throughout the major portion of their length. At their ends the sides 12 are brought together as shown at 13 with the terminal portion preferably rounded as shown and provided with registering holes 14 whereby this outer member may be connected with the links at one end of a skid chain or the like.

Disposed within this outer member 10 is a bar or plate 16 which is pivoted between the sides 12 by means of a suitable rivet 17 or the like which passes through the sides and through one end of the plate 16. This member 16 is formed at one edge with a plurality of notches 18 which are inclined as shown toward the bight portion of the outer member. It will be observed that the innermost portions of these notches are in registration with the slot 15. At opposite sides the member 16 is formed with depressions 19 with which are frictionally engaged inwardly pressed portions 20 in the side 12 of the outer member.

As shown in Figure 5, the member 16 may be formed with a single inclined notch 21 which leads into an elongated recess 22 registering with the slot 15 of the outer member.

In use it will be seen that the outer member 10 is secured to one end of a skid chain or the like by having one endmost link engaged within the holes 14 in the converging ends of the outer member. Assuming that the inner member 16 has been swung so as to extend outwardly of the outer member 10, the endmost link B at the other end of the chain is inserted within the slot 15, after which the plate member 16 is swung back into the outer member 10 with either of the notches 18 engaging the link B. When the inner member 16 is thus swung into position engaging the chain it will be apparent that the present portion 20 at the sides of the outer member will frictionally engage within the depressions 19 for preventing the inner member 16 from being swung accidentally out of the outer member.

In Figure 6 I have shown a modified form of my device in which I provide a much longer outer member 23 bent into loop form and having both end portions formed with a slot 24 which extends along the major portions of the sides. Pivoted between or within the outer member 23 are two members 25 corresponding to the plate member 16 and both of these members 25 are provided at one edge with inclined notches 26 having their inner ends registering with the slots 24. In this use of this form of the device it will be seen that the device may be utilized as a link for connecting a broken chain or it may be used for securing together the ends of a chain or two chains.

In Figure 7 I have shown an arrangement by means of which the two inner members 27, which are notched as in the previously described forms, are pivoted upon a common pivot 28 which passes through the sides of the elongated outer member 29. It is of course advisable that in this form that the adjacent ends of the members 27 be partially cut away as shown at 30 so that a clutch joint will be provided. The operation of this form is exactly the same as that of the form shown in Figure 6, the only difference being that both of the locking members 27 are upon a common pivot.

From the foregoing description and a study of the drawings it will be apparent that I have thus provided a simply constructed and consequently inexpensive chain fastening device which will be highly useful and particularly advantageous in view of the fact that accidental opening thereof be positively prevented regardless of the direction in which the vehicle equipped with skid chains having my fasteners thereon is driven. In my construction it will be apparent that there is nothing to catch in the mud and cause opening of the fasteners and that a great saving will be effected inasmuch as loss of skid chains will be prevented.

While I have shown and described the preferred embodiment of the invention, it is of course to be understood that I reserve the right to make such changes in the form, construction and arrangement of parts as will not depart from the spirit of the invention or the scope of the subjoined claim.

Having thus described the invention I claim:

A chain fastener consisting of an elongated member formed of a single strip of resilient material bent into elongated loop shape and having its ends brought together to define attaching ears, said ears being formed with registering holes, the other end of said body being formed with a longitudinal slot intersecting the opening between the sides of the body for the reception of the securing link of a chain, and a locking member of solid plate like form located within said body and having one end pivoted at a point adjacent said ears, said locking member being formed with an angular slot adapted to receive said securing link of the chain.

In testimony whereof I affix my signature

THOMAS A. JOHNSON